United States Patent [19]
Berninger

[11] 3,919,557
[45] Nov. 11, 1975

[54] WHOLE BODY LINE SCANNER

[75] Inventor: Walter H. Berninger, Schenectady, N.Y.

[73] Assignee: General Electric Company, Schenectady, N.Y.

[22] Filed: May 15, 1974

[21] Appl. No.: 470,047

[52] U.S. Cl. .............................. 250/366; 250/369
[51] Int. Cl. ............................................. G01t 1/20
[58] Field of Search ..................... 250/363, 366, 369

[56] References Cited
UNITED STATES PATENTS

| 3,769,509 | 10/1973 | Martone et al. ............... 250/369 X |
| 3,784,819 | 1/1974 | Martone et al. ................... 250/366 |
| 3,812,361 | 5/1974 | Prag et al. ....................... 250/366 X |
| 3,835,325 | 9/1974 | Fishman ............................. 250/366 |

Primary Examiner—Archie R. Borchelt
Attorney, Agent, or Firm—Jack E. Haken; Joseph T. Cohen; Jerome C. Squillaro

[57] ABSTRACT

A bar-shaped scintillator converts incident collimated gamma rays to light pulses which are detected by a row of photoelectric tubes positioned along the output face of the scintillator wherein each tube has a convexly curved photocathode disposed in close proximity to the scintillator. Electronic circuitry connected to the output of phototubes develops the scintillation event x-axis position coordinate electrical signal with good linearity and with substantial independence of the spacing between the scintillator and photocathodes so that the phototubes can be positioned as close to the scintillator as possible to obtain reduced distortion in the field of view and improved spatial resolution. A mechanical drive of the scanner results in an image of the gamma ray source being formed by sequencing the developed scintillation position coordinate signals in the y-axis dimension.

34 Claims, 10 Drawing Figures

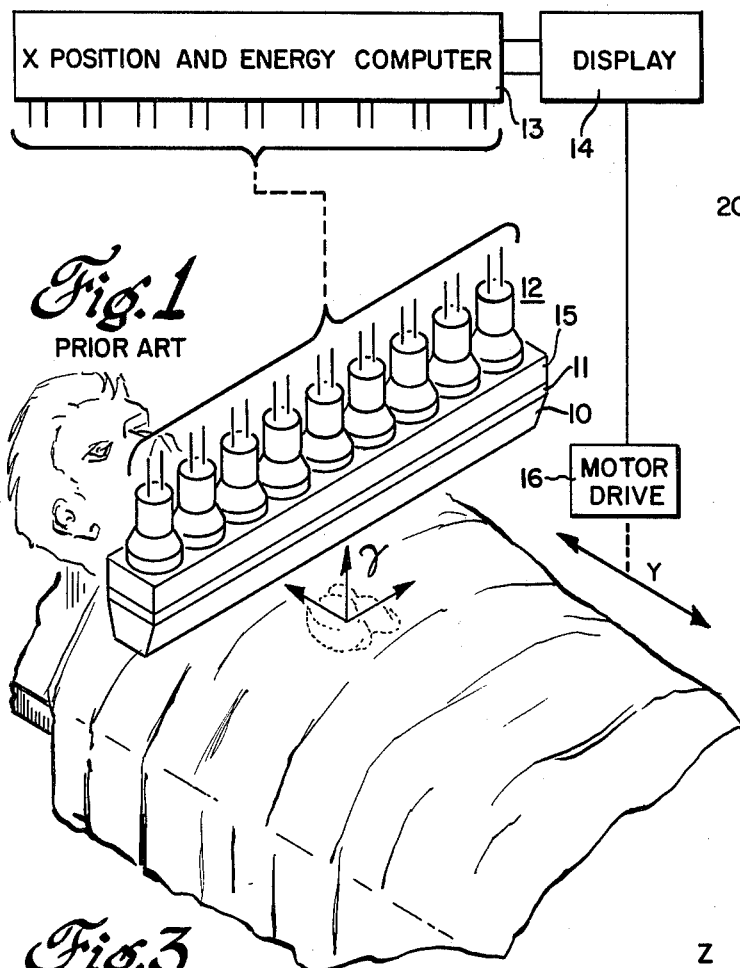
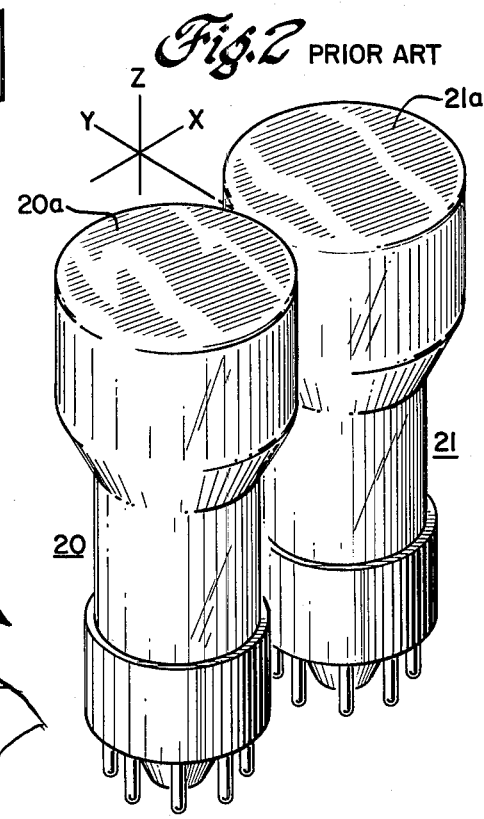
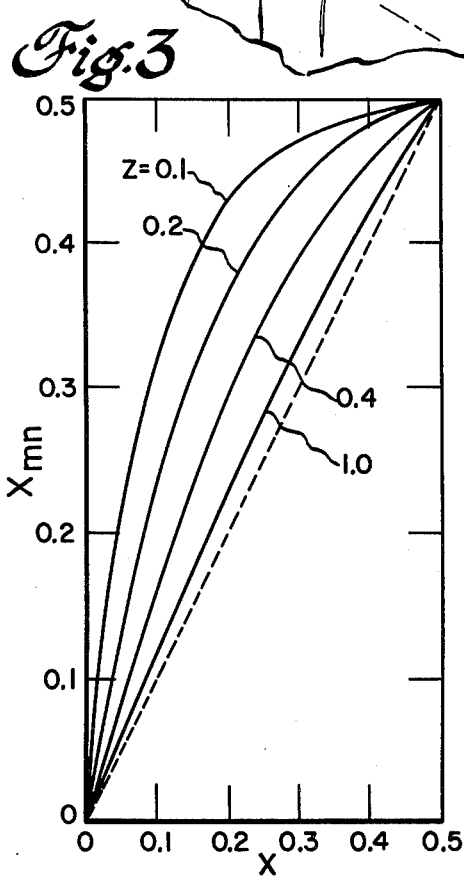
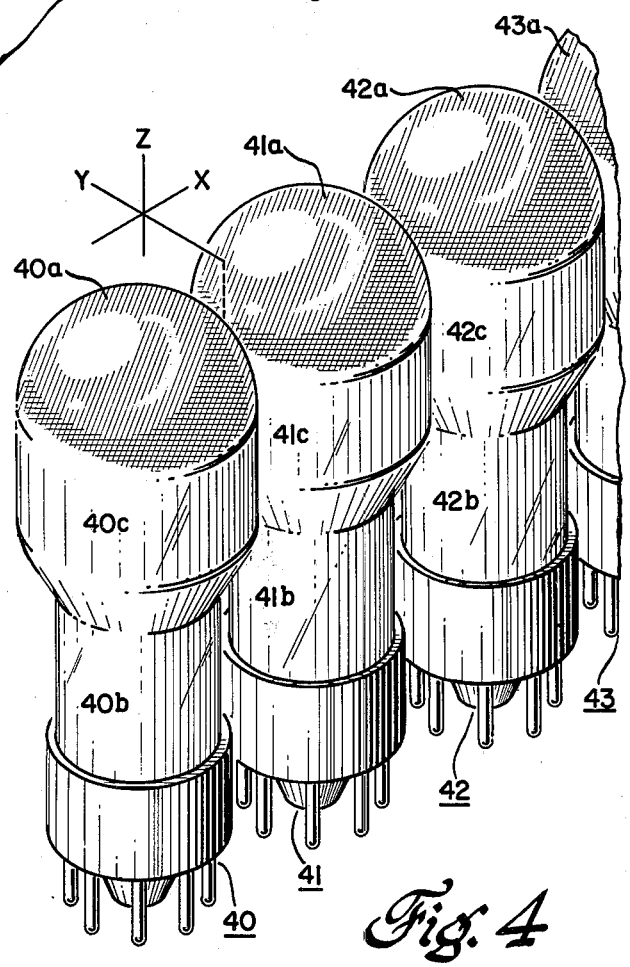

WHOLE BODY LINE SCANNER

My invention relates to a whole body line scanner nuclear medical apparatus for producing an image of a distribution of sources of nuclear particles or rays of electromagnetic radiation, and in particular, to a line scanner employing an array of a row of improved photoelectric tubes as the position sensor to obtain a relationship between the phototube output signals and position coordinate of the actual scintillation event which is both linear and substantially independent of the spacing between the scintillator and photocathodes and of the scintillator thickness.

Nuclear medicine is one of the most rapidly growing fields of medical diagnosis at the present time. The most general application of nuclear medicine in medical diagnosis involves administering to the patient, by injection, swallowing, or breathing, a small dose of a radiopharmaceutical, i.e., a short-lived gamma-ray-emitting istope (such as Technetium-99m) which has been formed into an appropriate chemical compound so that the isotope either is attracted to, or avoids, a particular organ or region of the patient's body. A noninvasive instrument is used for monitoring the isotope distribution by means of the gamma ray emission and provides the physician with valuable diagnostic information.

The monitoring of the gamma ray emission is accomplished either with a stationary apparatus known as the gamma camera, an improved embodiment of which is described and claimed in my concurrently filed U.S. Pat. application Ser. No. 470,048 (RD-5879) entitled "Improved Gamma Camera", or with an apparatus variously described as a whole body line or bar scanner wherein the scanner is moved relative to the object emitting the gamma rays. My present invention is directed to the latter type apparatus. A line scanner is described in U.S. Pat. No. 3,688,113 to Miraldi wherein the device includes a collimator, a bar-shaped scintillator and a pair of planar photocathode photoelectric tubes positioned along opposite end surfaces of the scintillator. The photoelectric tube output signals are detected by logarithmic amplifiers and are processed to yield position and energy information. This first prior art line scanner has two major disadvantages. First, the light pulse developed in the scintillator in response to the incident nuclear energy event suffers considerable attenuation due to surface effects which occur due to an exponential attenuation coating along the side surfaces of the scintillator bar. The exponential attenuation coating is utilized in order to produce a controlled and easily compensated dependence of the photo-multiplier signal intensity on the x-coordinate of the scintillation event. This light pulse attenuation implies a degradation of the optical photon collection statistics and adversely affects both energy and spatial resolution of the displayed image. Second, the light pulse undergoes scatter within the scintillator in its relatively long traverse along the length of the scintillator crystal which tends to limit spatial resolution of the device or, alternatively, necessitates a costly selection process in choosing the scintillator bar to be used.

The line scanner in the above-identified patent to Miraldi was subsequently modified by positioning an array of a row of the planar photocathode phototubes along the side surface of the scintillator bar opposite the input face along which the collimator is positioned. This attempt to overcome the above two cited disadvantages was unsuccessful because the close spacing between the planar photocathodes and output face of the scintillator resulted in a pronounced nonlinearity between the phototube output signals and the actual position of the scintillations as well as poor spatial resolution of the displayed image. It was found that the nonlinearity could be compensated for by the use of appropriate electronic correction circuitry, however, such electronic correction did not improve the poor spatial resolution. As a result, the planar photocathode phototubes were substantially spaced from the output face of the scintillator by means of a light pipe medium to obtain a good linearity between the phototube output signals and actual position of the scintillations in accordance with the teachings in U.S. Pat. No. 3,011,057 to Anger. It should be evident that the greater the spacing between the rear face of the scintillator and plane of the photocathodes, the greater the loss in the optical photons emitted from the scintillator that are collected by the individual photocathodes and the higher the noise level introduced into the system, thereby degrading the spatial resolution of the displayed image of the gamma radiation distribution. Also, the planar photocathode tube line scanner has a significant RMS error in position determination for the field of view which leads to distortion in the displayed image.

Therefore, one of the principal objects of my invention is to provide an improved whole body line scanner which has good linearity between the phototube output signals and the actual position of scintillation independent of the spacing between the scintillator and plane of photocathodes.

Another object of my invention is to provide an improved line scanner having a response characterized by both a linear and isotropic relationship between phototube signals and position of scintillation.

A further object of my invention is to provide an improved line scanner having a reduced error in position determination as compared to prior art line scanners.

Another object of my invention is to provide an improved line scanner having an improved spatial resolution as compared to prior art line scanners.

An additional object of my invention is to provide an improved line scanner with the ability to utilize a thicker scintillator with concomitant higher gamma ray detection efficiency than prior art line scanners of comparable resolution.

Although my line scanner apparatus will be described hereinafter as a gamma line scanner, it should be understood that it is also capable of use with other type electromagnetic radiation such as x-rays, as well as with nuclear particles such as positrons. That is, my line scanner can be used to detect the distribution of any radiation or particles to which the scintillator is responsive.

Therefore, another object of my invention is to provide an improved photomultiplier type of scintillation line scanner for imaging the distribution of incident nuclear particles or rays of electromagnetic radiation.

Briefly summarized, my invention is an improved photomultiplier type of scintillation whole body line scanner apparatus which includes a collimator suitable for collimating incident nuclear particles or rays of electromagnetic radiation being detected from an external source being scanned. A bar-shaped scintillator disposed at the output of the collimator produces a pulse of light in response to an absorbed incident particle or ray of electromagnetic radiation and an array consisting of a row of photoelectric tubes each having a geometrically corrected nonplanar photocathode is disposed in close proximity to the output face of the scintillator for detecting the optical photons and emitting electrons in response thereto. Electronic circuitry has inputs connected to outputs of the phototubes for resolving the phototube output signals into signals representing the x-axis coordinate of position and energy of each of the pulses of light sensed by the phototubes. A suitable read-out means such as an oscilloscope is connected to the output of the electronic circuitry for recording the x-axis coordinate of the detected scintillation. The line scanner apparatus is moved relative to the external source of the particles of rays being monitored in the y-axis direction so that a composite field of view is obtained which covers the area of interest from which the nuclear particles or radiation is being emitted. The phototube output signal and resultant x-axis coordinate electrical signal is linear with the actual scintillation position x-axis coordinate and the RMS error for the field of view is substantially smaller than for the prior art planar photocathode line scanner thereby reducing distortion of the displayed image. Further, my line scanner's response is highly isotropic in that the response due to a scintillation is substantially independent of the spacing between the output face of the scintillator and photocathodes whereas in the prior art planar photocathode line scanner the response is significantly nonisotropic for spacing less than 0.4 times a photocathode diameter thereby reducing the number of photons collected by the photocathode and increasing the noise level. The larger aggregate and individual phototube signals in my geometrically corrected photocathode line scanner system improves the spatial resolution of the displayed image over the prior art line scanner.

The features of my invention which I desire to protect herein are pointed out with particularity in the appended claims.

The invention itself, however, both as to its organization and method of operation together with further objects and advantages thereof may best be understood by reference to the following description taken in connection with the accompanying drawings wherein like parts in each of the several figures are identified by the same reference character and wherein:

FIG. 1 is a general schematic diagram of a prior art whole body line scanner utilizing an array of a row of planar photocathode phototubes substantially spaced from the output face of the scintillator;

FIG. 2 is an array of two phototubes used for x-axis coordinate position sensing and utilizing prior art planar photocathodes;

FIG. 3 is a graphical representation of a computer calculation of the normalized two-phototube line scanner developed x-axis coordinate versus the actual scintillation x-axis coordinate for various vertical spacings between the scintillation and the photocathodes for the array of planar photocathode tubes illustrated in FIG. 2;

FIG. 4 is an array of four phototubes used for x-axis coordinate position sensing and utilizing convexly curved photocathodes in accordance with my invention;

Figure 5:
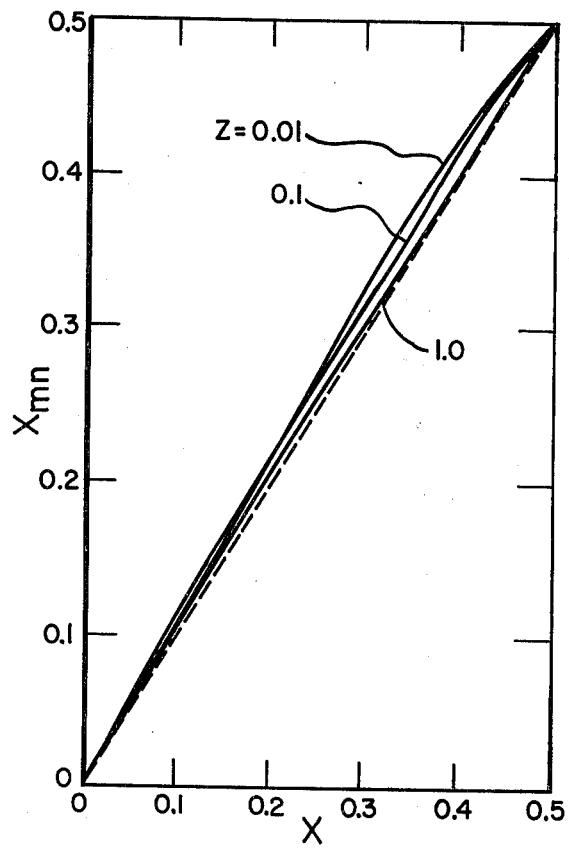
FIG. 5 is a graphical representation of a computer calculation of the normalized two-phototube line scanner developed x-axis coordinate versus the actual scintillation x-axis coordinate for various vertical spacings between the scintillation and phototubes for a two-tube array of my convexly curved photocathode tubes similar to that illustrated in FIG. 4.

Referring now in particular to FIG. 1, there are shown the essential components of a piror art photomultiplier type whole body gamma scanner which apparatus and its mode of operation will now be described. Gamma rays, indicated by the arrow, and emitted by a patient undergoing the nuclear medical examination, are collimated in a suitable collimator 10 which may typically be a focussing collimator fabricated of lead. The collimated gamma rays are then absorbed by a scintillator 11 which is typically formed of a sodium iodide crystal (either single or polycrystal) in the form of a long bar (generally 24 to 27 inches long) of thin dimension in the order of one half inch thickness and two inch width (i.e., having a rectangular cross section). The pulse of light resulting from each scintillation event in scintillator 11 is viewed by a close packed array 12 of generally a single row of 3-inch (or smaller) diameter photoelectric tubes having overlapping fields of view. The phototube output signals are resolved by a simple analog computer 13 to provide electrical signals proportional to the x-axis coordinate of the scintillation event, and to the energy of the absorbed gamma ray. The latter information provides the line scanner with an energy resolving capability. The processed electrical signals obtained from the various positions of the line scanner relative to the patient in the y-axis direction are displayed on a suitable read-out or image-display device 14 such as a conventional storage oscilloscope from whose face a photograph may be taken, if desired. The relative motion between patient and line scanner is generally obtained by the table top on which the patient is lying being moved by motor drive 16. Alternatively, the line scanner could be moved by such motor drive.

The use of an array of phototubes for sensing scintillations is old in the prior art, however its use as a means for determining the position coordinate of a scintillation event was limited previous to the aboveidentified patent to Anger by the non-linear and non-isotropic relationship between the phototube output signal and scintillation position.

In order to understand the nature of the problem of the nonlinearity and nonisotropy noted hereinabove, reference is made to FIG. 2 which illustrates an array of two conventional photoelectric tubes 20 and 21 each having a planar photocathode designated 20a and 21a, respectively. Although the diameter of the photocathode portion of phototubes employed in a line scanner typically is 3 inches or less, such diameter is normalized to 1.0 unit for purposes of the following explanation. The fields of view of the planar photocathodes include a scintillation event occurring at a point defined by the x, y and z coordinate axes wherein the x and y axes are in the plane of the photocathode and the z-axis is perpendicular thereto. As indicated in FIG. 2, the zero position of the x, y and z coordinate axes is at the common tangent of the photocathodes of tubes 20 and 21 with the x-axis running along a straight line defining the diameters of both photocathodes, the y-axis being perpendicular thereto (running along a straight line forming the common tangent to the photocathodes) and the z-axes defining the spacing between the plane of the photocathodes and the output face of scintillator 11. The x-axis coordinate of the actual scintillation event in scintillator 11 is herein defined as x whereas the electrical signal derived from the outputs of phototubes 20 and 21 in response to a scintillation at x is $x_m$ wherein $x_m$ takes the form;

$$x_m = \frac{\phi_1 - \phi_2}{\phi_1 + \phi_2} \quad (1)$$

where $\phi_1$ and $\phi_2$ are the solid angles subtended by the photocathodes 20a and 21a, respectively, as viewed from the coordinate position of the scintillation event.

The quantity $x_m$, normalized to its value at $x = 0.5$ (i.e., at the center of photocathode 21a) is called $x_{mn}$ and this quantity has been calculated and the results are presented in the graph of FIG. 3 which indicates pronounced nonlinearity when compared to the dashed line representing a linear relationship between the derived (from photoelectric tube outputs) coordinate $x_{mn}$ and the actual scintillation coordinate x. The curves in FIG. 3 also indicate that the response of the planar photocathode system is nonisotropic in that the reponse due to a scintillation at x depends upon the z coordinate of the scintillation. Thus, from FIG. 3 it is evident that a desired close spacing of the planar photocathode with respect to the output face of the scintillator results in a much more nonlinear relationship of $x_{mn}$ and x as indicated by the $z = 0.1$ and 0.2 curves. A very close spacing of these two components (i.e., z having a very small value) is highly desirable for obtaining improved optical photon statistics and low noise. It is noteworthy that both isotropy and linearity improve with increasing values of z. This latter fact was exploited in the Anger patent by incorporating a substantial spacing between the plane of the photocathodes and the output face of the scintillator. For a practical line scanner system, the desired linearity is first determined and then the minimum spacing consistent with such desired linearity figure is incorporated. In the prior art planar photocathode system, a compromise unfortunately has to be made between good linearity which implies the need for large scintillator-photocathode spacing with concomitant small optical photon statistics, and low noise which requires a minimum spacing with concomitant large number of photon collection per phototube. A generally used compromise spacing value (see FIG. 3) is approximately 0.4 times the photocathode diameter. This value of $z = 0.4$ is a scintillator-photocathode spacing of approximately 1 inch for a three inch diameter phototube which large distance degrades the optical photon statistics, that is, reduces the optical photon collection capability for each photocathode and thereby degrades spatial resolution of the displayed image on read-out component 14. Good linearity could also be obtained with smaller scintillator-phototube spacing by the alternative of using a greater number of smaller diameter phototubes, however, this approach introduces more complexity into electronic circuitry 13.

Referring now to FIG. 4, there is shown a linear array of four photoelectric tubes 40, 41, 42 and 43 having geometrically corrected, nonplanar photocathodes 40a, 41a, 42a and 43a, respectively, in accordance with my invention. In general, the geometrically corrected photocathodes are convexly curved, and as a specific example, the photocathode will be described herein as being of hemispherical form although it should be obvious that a photocathode having the form of part of a hemisphere or other convexly curved shape is within the teaching of my invention. The quantity $x_m$ in equation (1), again normalized to its value at $x = 0.5$, was calculated for a two-photocathode system of the type shown in FIG. 4 and the results are presented in the graph of FIG. 5. It is noted in FIG. 5 that the nonlinear $x_{mn} - x$ relationship is still realized, however, the deviation from linearity for any value of spacing z is never greater than the deviation from linearity of the planar photocathode system for $z \leq 0.4$. Furthermore, for any given value of z, the deviation from linearity of my geometrically corrected photocathode system is less than that of the planar photocathode system with the contrast being most significant for the smallest value of z (i.e., $z = 0.01$).

Line scanner operation with minimum values of spacing z between the output face of scintillator 11 and plane of photocathodes is further significant in that in my line scanner such minimum spacing still permits the use of greater thickness scintillators in the line scanner system. Since scintillations may occur at any depth in the scintillator, the nonisotropic characteristics of the prior art scanner require that such scintillator be thin (approximately inch) even though the relatively large spacing z is employed therein. However, since my line scanner system operates satisfactorily and with superior characteristics (including better isotropy) as compared to the prior art line scanner as will be described hereinafter, for spacings z theoretically as small as 0.01 times the photocathode diameter as indicated in FIG. 5, my line scanner system can employ a substantially thicker scintillator to thereby obtain higher detection efficiency for higher energies of the incident nuclear particle or rays of electromagnetic radiation.

The effect of nonlinearity and anisotropy exhibited by the position response functions of the FIGS. 3 and 5 graphs on the imaging characteristics of a line scanner system is twofold. First, the nonlinearity ($x_{mn} - x$) results in a field distortion similar to pincushion or barrel distortion (i.e., the displayed point is spaced from its undistorted position). Second, the anisotropy (variation of $x_{mn} - x$ with z) degrades the spatial resolution (i.e., causes a blurring of the displayed point) in a manner which is independent of the system linearity as will now be explained. It is assumed that the line scanner processes the x-axis position coordinate signal in such a manner that the displayed (i.e., corrected) value $x_d$ of the position coordinate x is a single-valued function of the form:

$$x_d = f(x x_m) \quad (2)$$

where $f(x_m)$ need not be linear in $x_m$. The problem arises from the fact that the measured coordinate $x_m$ is a function of both $x$ and $z$ of the form:

$$x_m = g(x, z) \qquad (3)$$

which function is represented by the FIGS. 3 and 5 graphs. Thus, scintillations occurring at a particular value of $x$ will yield a distribution of values of $x_d$ where the functional form of the distribution is determined by the distribution of $z$ values which is exponential for gamma ray absorption in a scintillator. The resultant distribution of $x_d$ (displayed) values has a nonzero width which sets a practical limit on the ability of an observer to distinguish closely spaced scintillation events. Hence, a desirable feature of a phototube array sensor is a minimal separation of the $x_m - x$ curves for $z$ values that are within the line scanner range. This desirable feature is clearly met by my invention since FIG. 5 indicates a very small separation of the $x_m - x$ curves for $z$ values in the range of 0.01 to 1.0.

Figure 6:
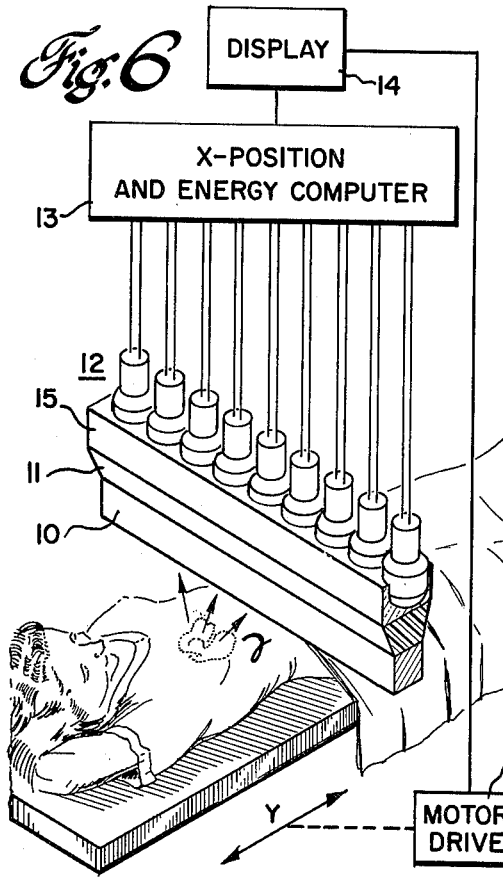
FIG. 6 is a general schematic diagram of a line scanner in accordance with my invention using convexly curved photocathode phototubes.
Figure 9:
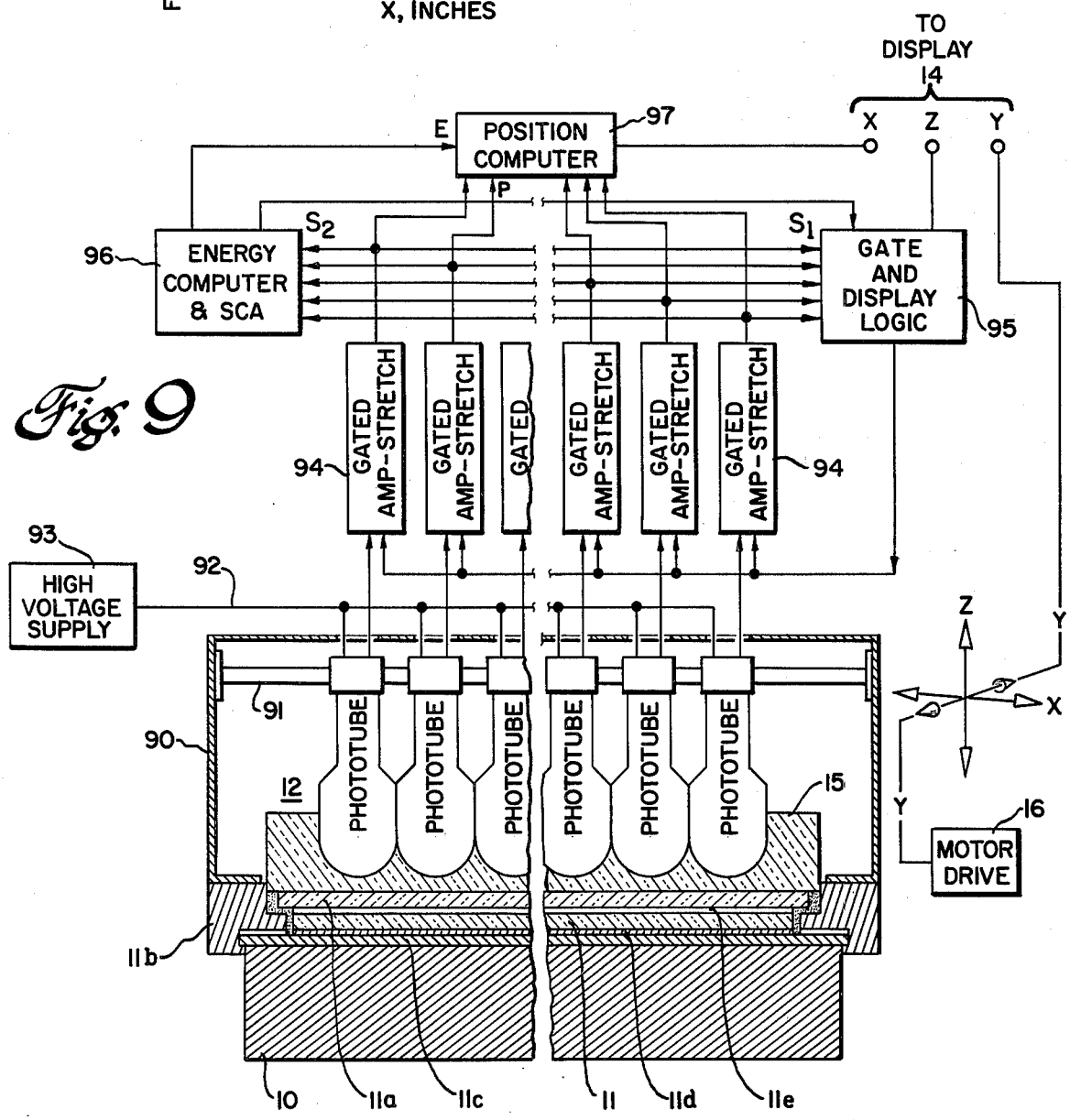
FIG. 9 is a more detailed schematic diagram of the optical portion of my line scanner and a general block diagram of the electronic circuitry utilized for resolving the phototube output electrical signals into energy and x-axis position coordinate electrical signals.

Referring now to FIG. 6, there is shown a schematic diagram of the whole body line scanner in accordance with my invention wherein the photocathodes in the array 12 of photoelectric tubes are convexly curved. For purposes of comparison with the prior art line scanner illustrated in FIG. 1 and the graphs of FIGS. 3 and 5, it will be assumed that my geometrically corrected, nonplanar, photocathode tubes are also each of three inch diameter, it being understood that the tubes may be larger (but this would be unlikely for a two-inch wide scintillator) or may be smaller, depending upon the particular application. The schematic diagram of my line scanner in FIG. 6 is in simplified form in order to be readily compared with the prior art line scanner illustrated in FIG. 1. A more detailed schematic diagram of my line scanner is illustrated in FIG. 9 which also includes a general block diagram of the electronic circuitry 13 utilized for resolving the photoelectric tube output signals into energy and x-axis position coordinate electrical signals. Collimator 10 may be the same type collimator utilized in the FIG. 1 line scanner, and thus for use with gamma rays is a suitable gamma radiation focussing collimator which may typically be a one inch thick lead sheet with a large number of small size holes therethrough arranged in rows and columns and appear parallel to each other from the front and rear of the collimator so that the collimator forms a nonfocussing system in the longitudinal direction thereof. However, the holes converge from the front to the rear of the collimator to a focal line parallel to the longitudinal axis of the collimator as descirbed in the patent to Miraldi. Collimator 10 is interposed between scintillator 11 and the particular organ or other region of the body of a patient being imaged. Alternatively, the recently developed coded imaging aperture system may be utilized instead of a gamma ray collimator. Scintillator 11 may again be a sodium iodide crystal (either single or polycrystal) in the form of a long bar, but preferably of trapezoidal cross section, although a rectangular cross section may be utilized. Thus, scintillator 11 may typically be of 24 to 27 inches length, 1 inch width along the input face, and 2 inch width along the output face in order to more nearly conform to the focussing collimator. Scintillator 11 has a thickness of at least one-half inch, it being apparent that in view of the discussion hereinabove, my scintillator is not limited in thickness as in the prior art line scanner and thus can be substantially greater than one-half inch in thickness as illustrated by the greater thickness in FIG. 6 relative to FIG. 1.

A major structural distinction between the prior art line scanner illustrated in FIG. 1 and my invention illustrated in FIG. 6 is in the light pipe medium 15 utilized between the output face of scintillator 11 and the photocathodes of the phototube array 12. In the prior art line scanner this light pipe medium serves two primary functions. First, it provides a near optical refractive index match between a glass plate 11a (to which plate the scintillator may be sealed for reasons of mechanical support) and the glass envelopes of the phototubes. Second, and most important, it provides an optically transparent medium to supply the offset distance between the plane of the photocathodes and the output face of the scintillator necessary for satisfactory line scanner linearity and position resolution. In practice, the light pipe may be glass or an ultraviolet transmitting plastic material such as polymethyl methacrylate (for example, the trademark LUCITE). By contrast, in my invention the primary function of the light pipe is simply that of providing a refractive index match between the glass backing of the scintiillator and the glass envelope of the phototubes. Thus, the input or scintillator end of my light pipe member 15 (which may be formed of a plastic material such as the trademarked LUCITE) has a flat surface whereas the output end has a plurality of concave depressions conforming to the outer surfaces of the convexly curved phototube glass faceplates. In the prior art light pipe 15, the output surface of the light pipe medium is substantially flat.

The number of phototubes in the array 12 positioned along the output end of light pipe member 15 is determined by the length dimensions of the scintillator, and the size of the phototubes is determined primarily by the output face width dimension of the scintillator. The phototubes are spaced as closely together as possible so that in the case of a 27 inch long, 2 inch wide output face scintillator, nine 3-inch diameter or fourteen 2-inch diameter photocathode phototubes are utilized. It is preferable, although not necessary, that an odd number of tubes be utilized in order to obtain a central tube that is coaxially disposed with scintillator 11 and collimator 10. The tubes are usually, although not necessarily, all identical and aligned parallel with each other. Each phototube consists of the photocathode 40a (see FIG. 4) at the input end thereof which faces the scintillator, and an electron multiplier section located within the narrower cylindrical portion 40b of the tube toward the output end thereof. The electron multiplier section includes a plurality of dynodes which may typically be 10 in number, as well as an anode. My geometrically corrected photocathode tube may have a structure, other than for the curved photocathode, which is the same as the conventional phototube illustrated in FIG. 2. However, due to the curvature of the photocathode in my tube, the wider cylindrical portion 40c of the tube adjacent the photocathode may be of significantly shorter length than in the conventional planar tube since the photocathode curvature provides a self-focussing of the electrons emitted from the photocathode and therefore the significant distance required for focussing the electrons in the conventional planar tube is not required. In both tubes, a conventional focussing electrode is employed for focussing the electrons emitted from the photocathode onto the first of the dynode stages.

The output of each phototube, (i.e., at the anode or last dynode thereof) is connected to inputs of electronic circuitry 13 which resolves the phototube output signals into energy and position coordinate electrical signals corresponding to the intensity and x-axis coordinate of position of each pulse of light produced in the scintillator for each momentarily fixed position of the line scanner relative to the patient. Thus, for each incident nuclear particle or ray of electromagnetic radiation which is emitted from an external source such as a patient undergoing a nuclear medical examination, and which passes through collimator 10 (disposed across the patient) and is absorbed in scintillator 11, there is produced a pulse of light therein in response to such absorbed incident event wherein the light pulse amplitude, as determined by the number of optical photons in each light pulse, is proportional to the energy of the absorbed incident particle or ray. The scintillator thus forms the first step in the imaging process by generating sequential narrow band visual light patterns as the line scanner moves relative to, and over the patient in the y-axis direction from which the gamma ray source (or other radiation or nuclear particle source) distribution may be computed. Due to the convexly curved form of the photocathodes, each photocathode in the tube array 12 senses the scintillation occurring in scintillator 11, although significant responses to each scintillation are limited to the photocathode most nearly aligned with the scintillation event and the two adjacent photocathodes.

The electronic circuitry 13 analyzes the intensity of the light pulse produced in the scintillator from which the energy of the incident gamma ray is deduced, and computes the x-axis position coordinate of each of the pulses of light by resolving the phototube output signals into a corresponding position coordinate electrical signal for those light pulses whose intensities fall within a predetermined range determined by the intensity analysis (energy computer) portion of the electronic circuitry 13. Thus, circuitry 13 may be generally described as a position and energy computer. The position coordinate computation consists of taking a weighted sum of the output signals of the phototubes. The electronic circuitry 13 is indicated generally in FIG. 9 and in detail in FIG. 10. At this point it is sufficient to note that the electronic circuitry in conjunction with my geometrically corrected phototubes provides the best position and energy resolution possible with the given phototube signals. The output of electronic circuitry 13 includes two output signals in the form of simultaneous pulses, one of which is proportional to the x-axis position coordinate of the scintillation event, and the second is a display pulse for driving the intensity axis of the read-out or display device 14. A third output signal is developed from the motor drive 16 circuit for establishing a y-axis position signal indicative of the position of the line scanner relative to the patient, generally in a head-to-toe or vice versa direction over the patient. This third signal is obtained in any conventional manner such as (1) using a stepper motor for drive motor 16, a pulse counter for counting the motor advances, and a digital-to-analog converter for developing the third (y-axis analog) signal, or (2) using a motor operating at a constant slow speed and having a wiper resistor circuit on the motor shaft with the third signal being obtained directly from the resistor wiper arm. Thus, in the case of an oscilloscope being utilized as the display 14, the x-axis coordinate position output signal of circuit 13 and y-axis coordinate position signal are supplied to the x and y-axis input of the oscilloscope and the display pulse output signal is applied to the z (intensity) axis of the oscilloscope. The z pulse could alternatively be used to trigger an analog-to-digital converter for obtaining a digitial recording, if desired.

Figure 8:
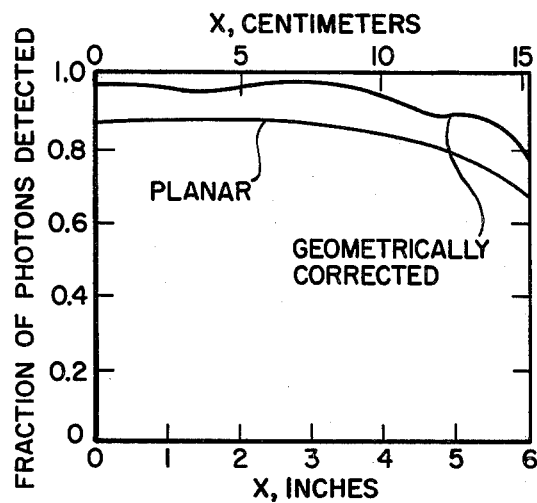
FIG. 8 is a typical graphical representation of the fraction of optical photons emerging from the scintillator that are collected by a phototube array for both the planar and convexly curved photocathodes in a gamma camera.

In FIG. 8 I present one result of a computer calculation of optical photon collection for the planar and my geometrically corrected photocathode arrays wherein the calculations were taken from the gamma camera described in my concurrently filed patent application Ser. No. (RD-5879) but which can be translated to my line scanner. The plot shown in FIG. 8 gives the fraction of photons emitted from the scintillator that are collected by the photomultiplier arrays as a function of the x coordinate of the scintillation for scintillations occuring along the x axis. In each gamma case an array of 19 3-inch diameter phototubes was assumed to view a 0.5 inch thick scintillator. The scintillator output face-photocathode spacing was 0.1 inch for my geometrically corrected photocathode array and was 1.25 inch for the planar photocathode array. FIG. 8 illustrates that the usable field of a practical line scanner is limited in spatial extent by virtue of reduced optical photon collection for scintillations occurring far from the line scanner center. A reasonable operational definition of the line scanner field of view that I have accepted is that region of the scanner field wherein the energy signal is greater than 90% of its maximum value, and applying this criterion to a nine tube array of three-inch diameter photocathode tubes yields a rectangular field of view having a length dimension of approximately 22 inches. It is noted that position response data remains usable over a considerably larger field than indicated in FIG. 8 and that photon collection efficiency is higher in my geometrically corrected array compared with the planar array.

Numerical calculation of the position response functions for both the planar and my geometrically corrected photocathode gamma cameras were made in my above-identified concurrently filed application Ser. No. (RD-5879) in order to obtain a means for comparing the responses of the two gamma camera systems. The calculations were based on the conventional assumptions utilized in the gamma camera and line scanner art, some of which are that (1) the scintillator has a refractive index of 1.8, (2) the light pipe has a refractive index of 1.5 and is matched to the glass faceplate of the phototube, (3) the photocathode diameter is three inches, (4) the photocathodes are spaced from the scintillator by 0.1 inch for my apparatus and 1- inches for the planar photocathode tube apparatus and (5) the scintillator thickness is 0.5 inch. The results of the gamma camera calculations can be translated to the line scanners and indicate that the RMS error for the entire field of view in my line scanner system is substantially less than for the planar photocathode system. Thus, there is a decided superiority in the error performance of my line scanner system over the prior art in addition to the significant improvement in isotropy as indicated with reference to FIGS. 3 and 5. Finally, my ability to utilize a very thin light piping medium as compared to the relatively thick medium in the planar cathode line scanner results in larger aggregate and individual photoelectric tube signals in my system. A calculation of the number of light photons collected by each of the photocathodes for the planar and geometrically corrected photocathode gamma cameras was also made in my application Ser. No. (RD-5879), and such results can also be translated to the line scanners to indicate that my line scanner has a much higher light photon collecting ability than the planar photocathode line scanner. This superior photon collecting feature of my geometrically corrected photocathode tube leads to a lower phototube contribution to the spatial resolution due to the improved photon statistics and thereby obtaining an overall significant improvement in the spatial resolution of the displayed image.

Figure 7:
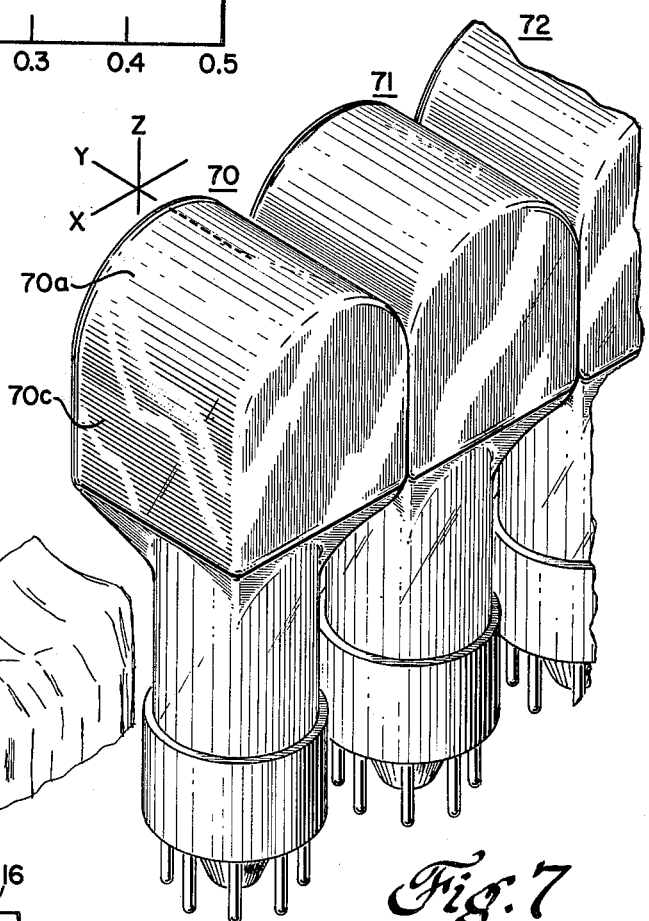
FIG. 7 is an array of a second embodiment of convexly curved photocathode phototubes used for x-axis coordinate position sensing in accordance with my invention.

Referring now to FIG. 7 there is shown an array of a second embodiment of geometrically corrected phototubes 70 which can be used in my line scanner apparatus. The significant distinction between the phototubes illustrated in FIG. 4 and FIG. 7 are that in the present figure, the larger diameter photocathode ends 70c of the tubes are generally square shaped thereby eliminating any spacing between adjacent phototubes so as to further improve the optical photon statistics. The surfaces of the photocathodes in the square shaped tubes are also suitably curved in order to obtain the geometric corrections described with reference to the tubes in FIG. 4, and in particular, said convex curved surfaces are that of paraxial half cylinders 70a, it being within the teaching of my invention to have the curved surfaces also be less than (i.e., portions of) half cylinders. In all other respects, the tubes in the present figure function in the same manner as those illustrated in FIG. 4.

Figure 10:
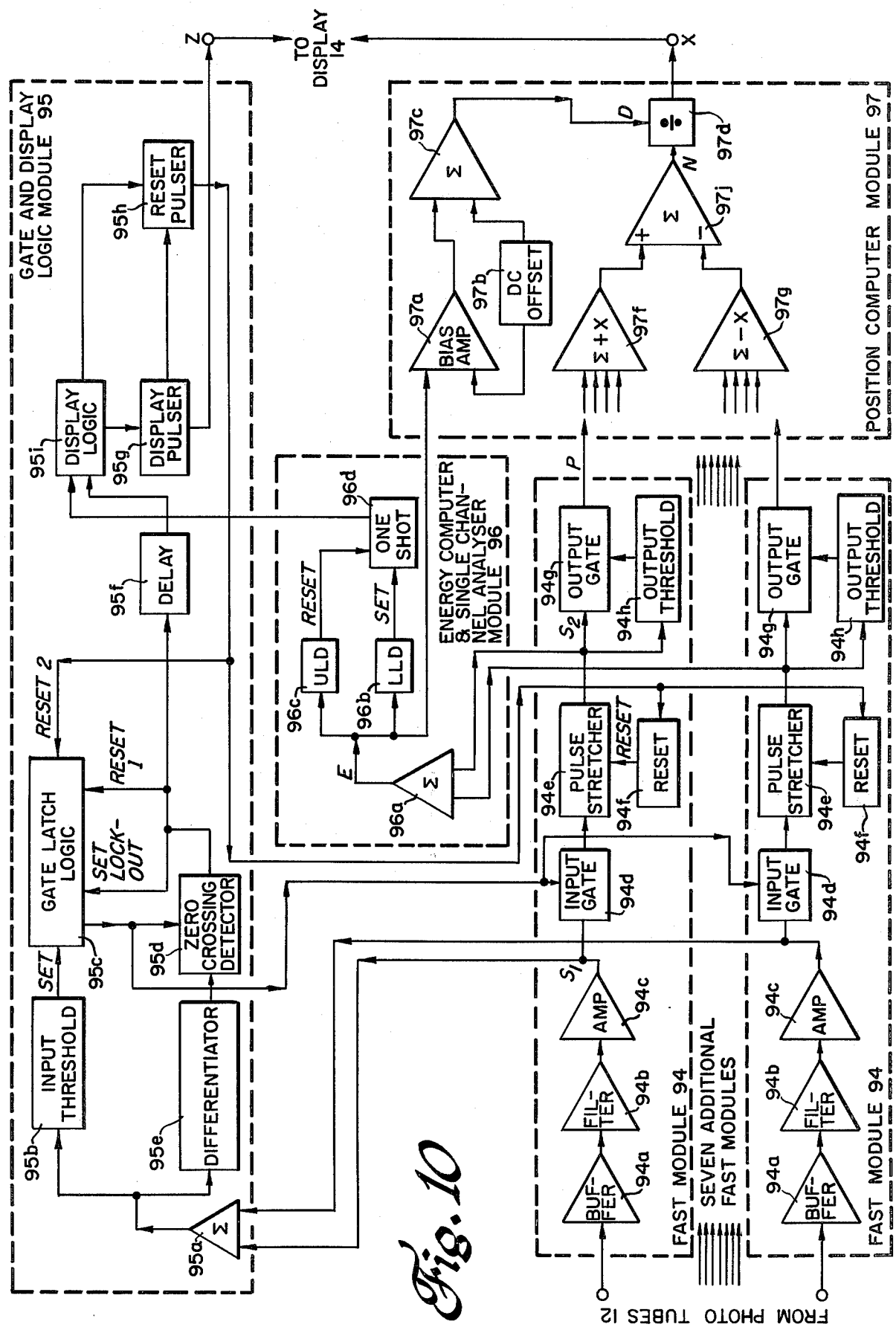
FIG. 10 is a more detailed block diagram of the electronic circuitry illustrated in FIG. 9.

Referring now to FIG. 9, there is shown in greater detail the structure of the portion of my line scanner associated with converting the incident gamma ray to electrical signals which are then resolved in electronic circuitry 13 shown in slight detail in this Figure and in greater detail in FIG. 10. Collimator 10 is of the same long, narrow form as scintillator 11 and is suitably fastened to the outside of the open input end of a light-tight housing 90 such as by being bolted thereto. Bar-shaped scintillator 11 is disposed at a long, narrow opening in the input end of housing 90 and is supported along its output face by being pressed and optical grease-coupled 11e to a like-shaped long, narrow glass plate 11a that has its peripheral surface sealed to a flange 11b at the (long, narrow) open end of housing 90 by means of a rubber compound 11e. Scintillator 11 is also sealed along its peripheral surface to flange 11b by means of rubber compound 11e so that the scintillator is supported in a rigid rubber mold on all surfaces except the input (collimator) and output (glass plate) ends. This manner of mounting assures the maximum freedom of relative thermal expansion and contraction without stressing the brittle scintillator. The side surfaces of the scintillator are normally protected by a chemically impervious barrier particularly to prevent the entrance of water. Light loss from the scintillator input face is minimized by packing the input face crystal surface and nonparallel side surfaces with a suitable material such as magnesium oxide power in order to make such crystal surface highly light-reflective. The end surfaces of scintillator 11 may also be made highly reflective, or highly light-absorbing, as desired. A like-shaped, long, narrow aluminum window 11c which is conventionally employed in line scanners, and is of thickness of the order of 0.030 inch, is interposed between collimator 10 and the reflective coating 11d on the input face of scintillator 11. The aluminum window, glass plate and scintillator are sealed within flange 11b and scintillator 11 is sealed to glass plate 11b by means of a suitable adhesive such as an epoxy resin. Housing 90 is typically rectangular in cross section having dimensions in the order of 32 by 6 inches for a 27 by 2 inch scintillator. Housing 90 is preferably backed with lead to provide shielding against extraneous gamma rays. The glass faceplates of the phototubes 12 are slightly spaced from the scintillator supporting glass plate 11a by the thickness of the LUCITE light pipe member 15. Light pipe member 15 may be fastened to glass plate 11a by being glued thereto (typically with an epoxy resin) as one convenient method. The linear array 12 of phototubes is supported to some extent by the concave depressions in light pipe member 15 within which the photocathode ends of the tubes are nested. However, the principal support for the tubes is a metal plate member 91 fastened to a flange along the inner surface of housing 90 near the closed output end thereof wherein such plate has holes formed therethrough and into which are fastened the sockets for the phototubes 12. Thus, tube socket holding plate member 91 and the concave depressions in light pipe member 15 provide for the support and parallel alignment of tube array 12. The output end of housing 90 may also be enclosed by lead shielding, or at least a material which will prevent ambient light from entering housing 90 through the output end.

Suitable holes are formed through the output end of housing 90 for passage of electrically insulated conductors therethrough. The electrical conductors are utilized for supplying the necessary d-c high voltage to the dynodes and anodes of the phototubes, and for transferring the phototube output signals from the respective anodes to the inputs of gated amplifier-pulse stretcher circuits 94 in electronic circuitry 13. Thus, high voltage electrical conductor 92 is connected from the output of a d-c high voltage supply 93, having a voltage output in the range of up to approximately 2 kilovolts, to the anodes of the respective phototubes in array 12. In like manner, a signal conductor is connected from the anode of each phototube to an input of a corresponding gated amplifier-pulse stretcher circuit 94 forming a part of electronic circuitry 13. A convenient means for obtaining the desired lower voltages that are applied to the various dynodes of each phototube is the connection of a resistive voltage dropping network across the appropriate terminals of each tube socket so that the appropriate voltage is developed for each dynode and the focussing electrode. There is a gated amplifier-pulse stretcher circuit (defined as FAST module in FIG. 10) 94 for each phototube, and each such circuit produces three output signals $S_1$, $S_2$ and P. The first signal, $S_1$, produced at an intermediate output of each circuit 94 is a near Gaussian pulse having an amplitude proportional to the intensity of the scintillation event as viewed by the associated phototube. This first signal $S_1$ is obtained in circuit 94 at the input to an INPUT gate component thereof. These gates are normally closed and are opened when the aggregate $S_1$ signal, derived by adding the $S_1$ signals from all the photocathode outputs, rises above a preset value. Once open, these INPUT gates remain open until the peak of the aggregate $S_1$ signal is sensed, at which time the gates are closed. The second signal $S_2$ is a gated and stretched version of signal $S_1$ having a duration controlled by a gate and display logic module 95. The $S_2$ signals are summed in an energy computer and single channel analyzer module 96 which summed signal is proportional to the total scintillation intensity, and hence to the gamma ray energy, and will hereinafter be known as the energy (E) signal. The energy signal is thus a gated and stretched version of the aggregate $S_1$ signal thereby suggesting an alternate method of derivation, that is, first summing all of the $S_1$ signals and then gating and stretching such summed signal. The third signal P is derived by discriminating and gating signal $S_2$. The P signals are applied to a position computer module 97 wherein a weighted summation of the various P signals is performed and the resultant signals are divided by the energy signal E to produce electrical signals representing the x and y-axis position coordinates of the scintillation. The energy signal E is also processed by a single channel analyzer (SCA) in module 96 which sets the display logic circuitry in module 95 to either a display "permit" or display "inhibit" mode. In the display permit mode, a pulse is applied to the Z-axis input of the display device 14 which typically is an oscilloscope, after a fixed delay from the peak of the input ($S_1$) pulse. The duration of the delay is variable over broad limits and is incorporated in order to permit the x-axis position coordinate signal to reach its final values before display. The y-axis position coordinate signal obtained from the motor drive 16 circuit is applied to the y-axis input of the display device 14 in order to obtain the scanning function which develops the displayed composite field of view by sequencing the x-axis position coordinate signals in the y-axis dimension.

Referring now to FIG. 10, there is shown a detailed block diagram of electronic circuitry 13. Obviously, other well known electronic circuits could be utilized in forming each of the particular circuits 94 through 97, however, as a typical example of suitable circuitry, and not by way of limitation of my invention, the following circuits, preferably being of the integrated circuit type, will now be described. The circuits designated "gated amplifier-pulse stretcher" 94 in FIG. 9 will hereinafter be designated the FAST modules wherein the term FASt represents the functions Filter, Amplifier, Stretcher, Threshold performed in such modules. The phototube output signals are independently preamplified by means of conventional charge-sensitive preamplifiers. Such preamplifiers may be located within housing 90 (at the socket of the phototubes 12) or may be in the input circuits in the FAST modules. The output of each preamplifier is connected to an input of a one-stage unity gain buffer 94a whose output drives a high-pass resistor-capacitor filter network 94b with provision for pole-zero cancellation by adjustment of one of the filter resistors. The high-pass filter has a time constant in the order of 0.5 microseconds. The output of each high-pass filter is connected to the input of circuit 94c which includes a noninverting amplifier having a gain of 21 and an active element low-pass resistor-capacitor filter network. An active element filter is used rather than a simple resistor-capacitor type due to its improved pulse-pair resolution capability. The low-pass filter time constant is approximately 0.5 microseconds. Circuit 94c further includes the output of the low-pass filter being a-c coupled to a fine gain control and output buffer, wherein the overall gain of this stage is variable from 0 to 2. A base line restoration circuit is preferably, although not necessarily, provided due to the use of a-c coupling at this stage in order to enhance the system high rate performance. The signal $S_1$ is obtained at the output of the buffer component in circuit 94c. The output of circuit 94c is also connected to the input of a shunt INPUT gate circuit 94d which provides access to a pulse-stretcher circuit 94e connected to the output thereof. The stretched pulse of the output of pulse-stretcher 94e has its duration controlled by the application of a reset pulse, derived from gate and display logic module 95, to reset circuit 94f which is connected to a RESET input of stretcher circuit 94e. Pulse-stretcher circuit 94e also includes in its output circuit a unity gain buffer whose output signal is signal $S_2$. A line scanner generally does not operate at a high signal rate, as compared to the gamma camera, and therefore does not generally require a (signal) pile-up rejection circuit. However, in the event that enhanced high rate performance is necessary, or desired, in a particular application, a sophisticated pile-up rejection circuit to provide control over the state of INPUT gate 94d will now be described. Gate 94d is a three-terminal analog shunt switch circuit which, when closed (disabled), shorts the input of the pulse stretcher 94e to ground and when opened (enabled), it connects the signal $S_1$ to the input of the pulse stretcher 94e. Gate 94d is normally closed but is opened when the aggregate $S_1$ signal rises above a preset value determined by an INPUT threshold circuit in gate and display logic module 95. Once open, the gates 94d are retained in this mode until the peak of the aggregate $S_1$ signal is sensed by the threshold circuit 95b at which time gates 94d are closed. This gate closure is the first of a two-part pile-up rejection process and the peak detection is accomplished by a fast differentiator 95e and gated zero-crossing detector 95d in the gate and display module 95. The second part of the two-part pile-up rejection process is implemented in the gate logic portion of module 95 which inhibits reopening the INPUT gates 94d until after a reset pulse has been sensed and the aggregate $S_1$ signal has recovered to a value below the input threshold established in module 95. The FAST module 94 thus provides bandpass filtering and shaping, with the $S_1$ signal having an amplitude proportional to the intensity of the scintillation as viewed by the associated phototube, signal $S_2$ being a gated and stretched version of signal $S_1$ with a flat top of amplitude equal to that of signal $S_1$ and duration controlled by display logic circuitry in module 95. The output of pulse stretcher 94e is connected to inputs of OUTPUT gate 94g and OUTPUT threshold circuit 94h. The gate in circuit 94g is connected to the input of a unity gain inverting buffer whose output is the P signal. The threshold level in each of OUTPUT threshold circuits 94h is adjustable so that the discriminator settings of all the channels are independent and, thus, can be adjusted for optimized position resolution.

The energy signal E is derived by summing the $S_2$ signals developed in the nine FAST modules (assuming nine phototubes) in a summer 96a in the energy computer and single channel analyzer (SCA) module 96. The output of summer 96a is applied to an input of the SCA and to an input of position computer module 97. The SCA input is buffered through a 0.25 gain amplifier which is coupled to comparators forming the active elements of parallel lower (LLD) and upper (ULD) level discriminators 96b and 96c, respectively of the SCA. The LLD level is set by a first resistor in the LLD comparator circuit 96b and the energy window is set by a second resistor therein. The output of LLD 96b is connected to the SET input of a monostable (one-shot) multivibrator 96d and the complementary output of ULD 96c is connected to the RESET input and is normally high, implying that the reset circuitry is normally inactive. The single channel analyzer operates in the following manner: When the amplitude of the E pulse at the inputs to the discriminators 96b and 96c exceeds the LLD setting, the comparator in LLD 96b conducts which, in turn, causes multivibrator 96d to produce an output pulse. If the input pulse amplitude to LLD 96b increases further, and thereby surpasses the sum of the LLD setting and the energy window, the ULD output goes low thereby resetting the multivibrator output. In the absence of a resetting command, the multivibrator 96d pulse duration is controlled by a resistor-capacitor network having a time constant of approximately 0.5 microseconds longer than the sum of delay and display pulse durations produced in gate and display logic module 95. It should be noted that the multivibrator 96d output reaches its final value for a given input pulse before (or in the extreme case, exactly at) the time that the signal $S_1$ peak has been detected and thus the multivibrator output sets the operating mode of the display logic so that it can process its input signals in the proper time sequence.

The position computer module 97 accepts P signal inputs from 8 of the 9 FAST modules 94 (the one associated with the center phototube is not used) and also from the energy computer in module 96. A weighted summation of the various P signals is performed in position computer module 97 and the resultant signals are divided by the energy signal E to produce the x-axis position coordinate of the scintillation event by computing the quantity:

$$x = \frac{\sum_{+x} k_{xi}P_i \quad \sum_{x} k_{xi}P_i}{E} \quad (4)$$

where the quantities $P_i$ are the FAST module P outputs associated with the $i$-th phototube and $k_{xi}$ are the weighting factors associated with the $x$ axis. The two summations involved in the above equation involve those phototubes lying, respectively, to the right and left reference to a coordinate system whose origin is at the line scanner center. The combination of a bias amplifier, summer and d-c offset is utilized to process the energy E signal and provide a d-c offset to an analog pulse divider in order to avoid a divide-by-zero condition and thereby improve the response time of the position computer. Thus, the output of summer 96a is connected to the input of a bias amplifier 97a which subtracts a preset, but adjustable, value (the bias) from the E pulse. The output of bias amplifier 97a is a unipolar pulse which may be described as an inverted version of the input pulse with its lower portion removed. Pulses of amplitude lower than the bias level yield a zero output. The bias amplifier output and a d-c voltage equal to the bias voltage, and obtained from d-c offset circuit 97b are summed in summer 97c to produce a pulse signal of amplitude equal to E and having a d-c offset equal to the bias voltage. The resulting signal is applied to the denominator (D) input of analog pulse divider circuit 97d utilized in implementing the above equation.

The computation process involved in the above equation determines the x-axis position coordinate of the scintillation event by taking a weighted sum of the P output signals of the various phototubes using weights chosen on the basis of the x-axis coordinate of the phototubes. Thus, assuming a linear array of the nine phototubes as shown in FIG. 6, summer 97f has four inputs connected to the gate 94g outputs associated with the four phototubes having centers to the right of the $x = 0$ axis. In like manner, summer 97g has four inputs connected to the gate 94g outputs associated with the four phototubes centered to the left of the $x = 0$ axis. Thus, the output of summer 97f represents the $+x$ axis weighted summation $$\sum_{+x} k_{xi}P_i$$

in the equation (4) and the output of summer 97g represents the $x$ axis weighted summation $$\sum_{x} k_{xi}P_i.$$

Summer 97j has inputs connected to the outputs of summers 97f and 97g and computes the difference of the output signals thereof (i.e., the numerator of equation (4)). The output of difference amplifier 97j is connected to the numerator (N) input of divider 97d. It should be noted that devices 97f, 97g and 97j could be combined into a single unit, however, such arrangement leads to an interdependence among the weighting factors of the different phototube channels. In my arrangement, the various weighting factors (resistors connected in the input circuits of summers 97f and g, are completely independent and are adjustable simply by changing the value of the associated weighting resistor. The weights assigned to each input of summer 97f, g are determined by the center of the associated phototube relative to the $x = 0$ axis (i.e., in $$\sum_{+x} k_{xi}P_i,$$

the weights associated with the first, second, third and fourth tubes spaced from the center tube are 1.0, 2.0, 3.0 and 4.0 respectively). The output of analog pulse divider 97d is an electrical pulse signal representing the x-axis position coordinate of the scintillation and is connected to the X-axis input of a suitable read-out or display device 14 such as a conventional storage oscilloscope.

The functions of the gate and display logic module 95 are to control the INPUT gates 94d in FAST module 94, to provide a display pulse for those pulses accepted by the single channel analyzer, and to reset the FAST module pulse-stretchers 94e. These three functions must be carried out with suitable timing to permit pile-up rejection and, in the case of the display pulse, to permit settling of the pulse dividers (97d and 97e) to their final values. The inputs to gate and display logic module 95 consist of the accept-reject signal from the output of multivibrator 96d which sets the display logic circuitry to either the display permit or display inhibit mode, and the signal $S_1$ outputs from FAST modules 94. Summer 95a has nine inputs connected to the signal $S_1$ outputs of the output buffers in amplifier circuit 94c to produce an inverted sum of such signals. The output of summer 95a is connected to an input of an INPUT threshold circuit 95b which functions to open the FAST module INPUT gates 94d when the aggregate $S_1$ signal exceeds a preset level determined by a resistor setting of a discriminator in circuit 95b. The output of threshold circuit 95b is at logic low in the absence of light pulse detection by the photocathodes. When the phototubes sense a scintillation event and the aggregate $S_1$ signal at the output of summer 95a exceeds the level preset by INPUT threshold circuit 5b, the output of circuit 95b transitions to a logic high state which is applied to a SET input of a gate latch logic circuit 95c, causing the gate latch output to assume a logic low state as soon as the input threshold is exceeded. The output of the gate latch logic circuit 95c is connected to the INPUT gates 94d in FAST module 94 and a low output opens such INPUT gates. The gate latch logic circuit 95c also provides a "strobe" signal to a first input of a comparator used as a zero-crossing detector 95d. The strobe signal disables the output of the comparator except when the FAST INPUT gates 94d are open.

The output of summer 95a is also connected to an input of a circuit which provides control over display and reset timing and FAST INPUT gate disabling. Thus, the output of summer 95a is connected to the input of a differentiator circuit 95e which consists of a resistor-capacitor high-pass filter having a short time constant in the order of 150 nanoseconds to thereby provide the differentiation function. The differentiated signal is amplified to produce a bipolar output pulse with a positive leading lobe followed by a negative trailing lobe having a signal zero-crossing approximately 250 nanoseconds after the peak of the aggregate $S_1$ signal. This differentiated signal is connected to a second input of the strobed zero-crossing detector 95d which has a small positive threshold and provides an output pulse whose leading edge occurs simultaneously with the zero-crossing of the differentiated signal.

The gate latch logic portion of the gate and display logic module 95 operates in the following manner. For an initially quiescent system excited by an input pulse (resulting from a sensed scintillation event) of amplitude greater than the input threshold level established in circuit 95b, and beginning at $t = 0$, the following sequence of events occurs. For $t0$, the signal at the output of gate latch logic circuit 95c is at a logic high, and the output of zero crossing detector 95d is kept at logic low by the strobe signal. As the $S_1$ pulse amplitude increases, the zero-crossing detector threshold is surpassed and the detector output provides a logic low signal. As the aggregate $S_1$ input pulse amplitude increases further, the input threshold level established in INPUT threshold circuit 95b is reached and a gate signal at the output of gate latch logic circuit 95c is produced which both opens the INPUT gates 94d in the FAST module and enables the zero-crossing detector output. The zero-crossing detector output remains at logic low. As the aggregate $S_1$ signal reaches its peak, its derivative at the output of differentiator 95e passes through zero thereby causing zero-crossing detector circuit 95d to transition to a logic high state.

The output of zero-crossing detector 95d is connected to the input of three different circuits. First, it is connected to a RESET 1 input of the gate latch logic circuit 95c so that the leading edge of the zero-crossing detector output signal causes the gate latch output to transition to a logic high state to thereby close the FAST module INPUT gates and, after a brief delay, the output of detector 95d is disabled through the strobe input. Thus, the output of detector 95d consists of a single narrow voltage spike occurring approximately 250 nanoseconds after the aggregate $S_1$ signal has reached its peak. The delay period is variable by varying either the differentiator time constant or the zero-crossing detector threshold level.

The output of detector 95d is also connected to a SET LOCKOUT input of the gate latch logic circuit 95c in order to set the output thereof to a logic high state which effectively (through a NOR gate) removes the connection between INPUT threshold circuit 95b and the SET input to gate latch logic 95c. This function prevents the gate latch from opening the FAST INPUT gates or reenabling the zerocrossing detector until after the gate latch has been reset by reset pulser 95h.

The third output of zero-crossing detector 95d is connected to the input of a delay circuit 95f which is a monostable multivibrator. The zero-crossing detector 95d thus triggers multivibrator 95f to produce a delay pulse of approximately 0.5 microseconds duration. This delay pulse is appropriately directed to either a display pulser circuit 95g or a reset pulser circuit 95h by means of a display logic circuit 95i connected to the output of multivibrator 95f and having a second input connected to the output of the multivibrator 96d in the single channel analyzer module. Thus, the delay pulse at the output of multivibrator 95f is directed to display pulser 95g or reset pulser 95h as determined by the status of the SCA output. Thus, when the SCA accepts a pulse (the energy E pulse amplitude exceeds the LLD setting) a display pulse of 2.5 microsecond duration is initiated at the end of the delay pulse produced by multivibrator 95f and the falling edge of the display pulse triggers the reset pulser 95h to initiate a reset pulse of 0.5 microseconds duration. The output of display pulser 95a is connected to the Z-axis (intensity) input of an oscilloscope comprising the display unit 14. Thus, in the display permit mode of operation, a display pulse is applied to the Z-axis input of the oscilloscope after a fixed delay from the peak of the input $S_1$ pulse in order to permit the x-axis coordinate signal to reach its final values before display. A buffered output of the reset pulser 95h is connected to the reset circuit 94f of the pulse-stretcher 94e in the FAST modules as well as to a RESET 2 input of gate latch logic circuit 95c. When the gate latch is reset the second time, the circuit is in a state to process the next pulse at any time after the input ($S_1$ pulse) has recovered below the input threshold level. Thus, at the end of the display pulse which is of variable duration, a reset pulse is triggered which resets the pulse-stretchers in the FAST modules and allows the gate latch logic 95c to remove the INPUT gate 94d disable condition as soon as the input $S_1$ signal recovers to below the input threshold. In the display inhibit mode, the display pulser 95 g is disabled and the reset pulser 95h is triggered to initiate the reset pulse at the same time that the input gates 94d are closed.

From the foregoing description, it can be appreciated that my invention makes available an improved line scanner which has the highly desirable characteristic of a linear and isotropic relationship between the phototube output signal and scintillation event so that the RMS error is considerably decreased over that obtained in the conventional planar photocathode line scanner apparatus and also has improved optical photon statistics and also permits the use of a thicker scintillator. The decreased RMS error results in less distortion in the field of view of the line scanner thereby obtaining a better uniformity of field of view as compared to the conventional planar photocathode line scanner, the improved photon statistics result in improved spatial resolution and the use of a thicker scintillator results in obtaining higher detection efficiency, especially for higher energies of the incident gamma ray or nuclear particle in my line scanner as compared to the prior art planar photocathode scanner of comparable resolution.

Having described a specific embodiment of my improved line scanner, it is believed that modification and variation of my invention are possible in light of the above teachings. Thus, the electronic circuitry 13 can utilize any of a number of conventional circuits for performing the position coordinate and energy computation. For example, two alternate approaches to the electronic processing system might be based on (a) the prior art delay line technique previously employed in the read-out of a gamma camera and (b) a variation on the position computation described in equation (4) wherein $$x = N + \frac{k_{x,+1} X_{N+1} \; k_{x,-1} X_{N-1}}{E}$$

wherein N is the index number of the photomultiplier exhibiting the largest amplitude for the given scintillator event. In this system N would be determined by auxiliary conventional circuitry not herein involved. Also, it is recognized that the circuit illustrated in FIG. 10 can be simplified, although with a decrease in flexibility and, depending upon the simplification, a requirement to insure that all the amplifiers have identical timing characteristics. Finally, the field of view of my scanner may be extended by having only the two outermost tubes be of the planar photocathode type, and such two tubes may be oriented parallel to the others or tilted slightly toward each other. It is, therefore, to be understood that changes may be made in the particular embodiment of my invention as described which are within the full intended scope of the invention as defined by the following claims.

What I claim as new and desire to secure by Letters Patent of the United States is:

1. In an improved scanning radiation detector responding to incident nuclear particles or rays of electromagnetic radiation and producing electrical signals corresponding to the coordinate of position of each incident event linearly therewith and substantially independent of spacing between the light pulse producing means and photoelectric tube components of the detector, the combination comprising means for collimating incident nuclear particles or rays of electromagnetic radiation emitted from an external source, means having an input end at an output end of said collimating means for producing a pulse of light in response to an absorbed incident nuclear particle or ray of electromagnetic radiation, the number of optical photons in each light pulse being proportional to the energy of the absorbed incident particle or ray, an array of photoelectric tubes having geometrically corrected nonplanar photocathodes disposed in close proximity to an output end of said light pulse producing means for detecting the optical photons and emitting electrons in response thereto, outputs of said photoelectric tubes producing electrical signals in response to the detected optical photons, electronic circuit means connected to the outputs of said photoelectric tubes for resolving the photoelectric tubes output electrical signals into electrical signals representing the x-axis coordinate of position of each of the pulses of light produced in said light pulse producing means and substantially linearly therewith and substantially independent of spacing between said light pulse producing means and the photocathodes of said plurality of said photoelectric tubes as a direct result of the geometrically corrected nonplanar photocathodes so as to permit the close spacing of the photocathodes to said light pulse producing means, and means for scanning the external source of nuclear particles or rays of electromagnetic radiation in the y-axis direction.

2. The combination set forth in claim 1 wherein
the spacing between the output end of said light pulse producing means and a plane parallel thereto and defining the apexes of the photocathodes of said photoelectric tubes is less than 0.40 times the diameter of one of the photocathodes.

3. The combination set forth in claim 1 wherein
the spacing between the output end of said light pulse producing means and the photocathodes of said photoelectric tubes is less than 0.40 times the diameter of the photocathode of one of the photoelectric tubes.

4. The combination set forth in claim 1 wherein
the spacing between the output end of said light pulse producing means and the photocathodes of said photoelectric tubes is as small as approximately 0.10 times the diameter of the one of the photocathodes while maintaining the substantial linearity of position coordinate electrical signals with position of light pulse and substantially independent of the spacing between said light pulse producing means and the photocathodes.

5. The combination set forth in claim 1 wherein
said plurality of said photoelectric tubes have the apexes of their photocathode disposed in a plane parallel to a plane defining the output end of said light pulse producing means.

6. The combination set forth in claim 1 wherein
the photocathodes are each curved in the form of a portion of a hemisphere.

7. The combination set forth in claim 1 wherein
the photocathodes are each curved in the form of a hemisphere.

8. The combination set forth in claim 1 wherein
the photocathodes are each convexly curved.

9. The combination set forth in claim 1 and further comprising
a light pipe means disposed between the output end of said light pulse producing means and the photocathodes of said photoelectric tubes for increasing efficiency of light pulse transmission therebetween as well as strengthening the assembly thereof.

10. The combination set forth in claim 1 and further comprising
read-out means connected to outputs of said electronic circuit means and said source scanning means for recording dual axis coordinates of the incident ray or particle.

11. The combination set forth in claim 1 wherein
said photoelectric tubes are all oriented in parallel relationship.

12. The combination set forth in claim 1 wherein all of the photoelectric tubes in said array have the geometrically corrected nonplanar photocathodes.

13. The combination set forth in claim 1 wherein outermost photoelectric tubes in said array have planar photocathodes, the remaining photoelectric tubes having the geometrically corrected nonplanar photocathodes.

14. The combination set forth in claim 13 wherein the outermost photoelectric tubes having planar photocathodes are tilted slightly toward each other in order to extend the field of view of said detector, the geometrically corrected nonplanar photocathode photoelectric tubes oriented in parallel relationship to each other.

15. An improved line scanner comprising
a housing having an input and an output end,
a collimator for gamma radiation positioned at the input end of said housing for collimating incident rays of gamma radiation emitted from a source located external of said housing,
a scintillator having an input face juxtaposed with an output end of said collimator for producing a pulse of light in response to an absorbed incident gamma ray, the number of optical photons in each light pulse being proportional to the energy of the absorbed gamma ray,
an array of a plurality of photoelectric tubes positioned in said housing, at least some of said tubes each having a geometrically corrected nonplanar photocathode disposed in close proximity to an output face of said scintillator for detecting the optical photons and emitting electrons in response thereto, outputs of said photoelectric tubes producing electrical signals in response to the detected optical photons,
electronic circuit means connected to the outputs of said photoelectric tubes for resolving the photoelectric tubes output electrical signals into electrical signals representing the x-axis coordinate of position of each of the pulses of light produced in said scintillator and linearly therewith and substantially independent of spacing between the output face of said scintillator and a plane defining the apexes of the photocathodes, and
means for scanning the external source of gamma radiation in the y-axis direction.

16. The improved line scanner set forth in claim 15 and further comprising
read-out means connected to outputs of said electronic circuit means and said scanning means for recording the coordinates of position of the incident pulses of light produced in said scintillator.

17. The improved line scanner set forth in claim 15 wherein
the spacing between the output face of said scintillator and plane of photocathode apexes is as small as approximately 0.10 times the diameter of one of the photocathodes in which spacing the position coordinate electrical signals are substantially linear with the position of the corresponding pulse of light produced in said scintillator and substantially independent of the spacing between the output face of said scintillator and the plane of the apexes of the photocathode.

18. The improved line scanner set forth in claim 15 wherein
the spacing between the output face of said scintillator and the plane defining the apexes of the photocathodes is less than 0.40 times the diameter of one of the photocathodes.

19. The improved line scanner set forth in claim 15 wherein
the plane defining the apexes of the photocathodes is parallel to the output face of said scintillator.

20. The improved line scanner set forth in claim 15 wherein
the photocathodes are each curved in the form of a portion of a hemisphere.

21. The improved line scanner set forth in claim 15 wherein
the photocathodes are each curved in the form of a hemisphere.

22. The improved line scanner set forth in claim 15 wherein
the photocathodes are each convexly curved.

23. The improved line scanner set forth in claim 15 wherein
the photocathode of each photoelectric tube being contained in an input end of said photoelectric tube which is circular in cross section.

24. The improved line scanner set forth in claim 15 wherein
the photocathode of each photoelectric tube being contained in an input end of said photoelectric tube which is square in cross section.

25. The improved line scanner set forth in claim 24 wherein
the photocathodes are each curved in the form of a half cylinder having cylinder axes oriented parallel to y-axis.

26. The improved line scanner set forth in claim 24 wherein
the photocathodes are each curved in the form of a portion of a half cylinder.

27. The improved line scanner set forth in claim 15 and further comprising
a solid light pipe member disposed in said housing between the output face of said scintillator and the photocathodes of said photoelectric tubes, said light pipe member having a planar input surface and an output surface containing concave depressions conforming to the shape of the photocathodes so that said light pipe member increases the efficiency of light pulse transmission from scintillator to photocathodes as well as strengthening the assembly thereof and aiding in alignment of the photoelectric tubes.

28. The improved line scanner set forth in claim 16 wherein
said read-out means is an oscilloscope.

29. The improved line scanner set forth in claim 15 wherein
the array of photoelectric tubes is a linear array, all of the tubes except the outermost two being parallel to each other and having the geometrically corrected nonplanar photocathodes.

30. The improved line scanner set forth in claim 29 wherein
the two outermost tubes are also parallel to the other tubes.

31. The improved line scanner set forth in claim 29 wherein
the two outermost tubes being tilted slightly toward each other so that the photocathodes thereof are also tilted toward each other.

32. The improved line scanner set forth in claim 29 wherein the two outermost tubes also have the geometrically corrected nonplanar photocathodes.

33. The improved line scanner set forth in claim 29 wherein the two outermost tubes have planar photocathodes.

34. The improved line scanner set forth in claim 29 wherein said scintillator is bar-shaped of length substantially conforming to the length of the linear array of tubes and having a trapezoidal cross section, the input face of said scintillator having a smaller width dimension than the output face thereof.

* * * * *